United States Patent
Moquin et al.

(10) Patent No.: US 7,024,175 B1
(45) Date of Patent: Apr. 4, 2006

(54) SYSTEM FOR MASKING MICROPHONIC VOICE SIGNALS IN WIRED TELECOMMUNICATIONS EQUIPMENT

(75) Inventors: Philippe Moquin, Kanata (CA); Bipin Pillay, Ottawa (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/571,534

(22) Filed: May 16, 2000

(51) Int. Cl.
*H04Q 7/20* (2006.01)

(52) U.S. Cl. .................. 455/411; 455/410; 380/252

(58) Field of Classification Search ............ 455/410, 455/411, 550, 414, 414.1; 379/406.04, 93.01, 379/189, 161, 168, 184, 194; 380/2, 257, 380/253, 252, 270
See application file for complete search history.

(56) References Cited

U.S. PATENT DOCUMENTS

| | | | |
|---|---|---|---|
| 2,932,693 A * | 4/1960 | Wilcox, Jr. ............... 380/252 |
| 3,497,623 A * | 2/1970 | Todd ...................... 380/254 |
| 3,718,765 A * | 2/1973 | Halaby .................... 380/252 |
| 3,944,743 A * | 3/1976 | Criglar et al. ............ 379/406.1 |
| 4,091,232 A | 5/1978 | Lenk et al. |
| 4,675,901 A * | 6/1987 | Smith et al. ............. 379/406.04 |
| 4,920,567 A | 4/1990 | Malek |
| 4,949,375 A | 8/1990 | Houle |
| 4,972,469 A * | 11/1990 | Saltwick et al. ............ 380/253 |
| 5,008,937 A * | 4/1991 | Yamamura et al. ......... 380/252 |
| 5,168,519 A * | 12/1992 | Scarinci et al. ............. 380/253 |
| 5,181,243 A | 1/1993 | Saltwick et al. |
| 5,454,037 A * | 9/1995 | Pacella ..................... 379/453 |
| 5,657,384 A * | 8/1997 | Staudacher et al. ..... 379/406.08 |
| 5,787,180 A * | 7/1998 | Hall et al. ................. 380/52 |
| 5,805,635 A | 9/1998 | Andrews, Jr. et al. |
| 5,835,585 A * | 11/1998 | Morse ..................... 379/424 |
| 5,911,119 A | 6/1999 | Bartholomew et al. |
| 5,963,621 A | 10/1999 | Dimolitsas et al. |
| 6,163,216 A * | 12/2000 | Murray et al. ............. 330/257 |
| 6,229,897 B1 * | 5/2001 | Holthaus et al. ........... 380/270 |
| 6,311,071 B1 | 10/2001 | Voroba et al. |

OTHER PUBLICATIONS

"Loop Extender Circuit for the MT8972 DNIC", MITEL Application Sheet MSAS-46, ISSUE 1, Apr. 1986, pp. 12-7 through 12-9.
"On-Hook Telephone Audio Security Performance Specifications" TSG Standard 5, Telephone Security Group, Mar. 1990.

* cited by examiner

*Primary Examiner*—Tilahun Gesesse
(74) *Attorney, Agent, or Firm*—Staas & Halsey LLP

(57) ABSTRACT

A system to thwart eavesdropping on microphonic audio signals generated by a powered telecommunications device connected to a communications line, comprising a noise generator for applying low level noise to the line, thereby masking microphonic audio signals, and a disconnect circuit for disconnecting the telecommunications device from the line in the absence of power to the telecommunications device.

14 Claims, 5 Drawing Sheets

SYSTEM FOR MASKING MICROPHONIC VOICE SIGNALS IN WIRED TELECOMMUNICATIONS EQUIPMENT

FIELD OF THE INVENTION

This invention relates in general to telecommunications surveillance in wired telecommunication equipment that exhibits microphonic behaviour, and more particularly to a circuit for masking acoustical signals picked up by such equipment so as to thwart attempts at monitoring conversations from a remote location where the telecommunications equipment is terminated.

BACKGROUND OF THE INVENTION

Conversations that are carried on over telephonic equipment are particularly vulnerable to eavesdropping using any of the many ways known to intercept voice audio from telephone conversations. One approach is to penetrate the telephone circuit between the telephone instrument and the telephone company switching office. A wide variety of eavesdropping devices are known that can be connected to the telephone circuit for monitoring telephone conversations. For many years efforts have been made to maintain the confidentiality of conversations between parties over such telecommunications equipment.

Telephone voice encryption devices have been devised to address the problem noted above by digitally encoding voice signals before transmission and decoding the voice signals at the receiving end. For example, systems have been devised that utilize high-grade algorithms, such as U.S. Data Encryption Standard (DES) and proprietary algorithms, preferably in conjunction with RSA Public Key Technology (RSA Data Security, Inc., Redwood City, Calif.), such as the Motorola, Inc., Government Electronics Group (Scottsdale, Ariz.) SECTEL series, or unique systems such as the U.S. government STU-III.

Many schemes exist for providing a secure communication channel while a telephone is in use (e.g. U.S. Pat. Nos. 3,718,765, 4,920,567, 5,181,243, 5,805,635, 5,911,119, 5,963,621). In most cases, commercial telephone encryption equipment cannot provide total voice security due to the eventual breakdown of intercepted data. Nonetheless, encryption remains the most popular technique for maintaining secrecy when the conversational content is sensitive in nature.

Although the foregoing prior art techniques have proven useful in providing secure voice communications over an active telecommunications channel, it is nonetheless still possible to eavesdrop on conversations in a room containing telecommunications equipment (e.g. telephone, facsimile machine, etc.) when the equipment is idle (i.e. on-hook). Unless one takes extraordinary precautions, virtually any equipment connected to a telephone line generates a microphonic signal. This is primarily due to the fact that most wired telecommunications systems use transformers to transmit duplex information over a pair of wires. With the advent of better and more sophisticated amplification and signal processing equipment, signals in the sub-micro-volt range can easily be monitored. This gives rise to a serious security risk since it is possible for an eavesdropper to connect listening equipment on the two conductors leading to the room in order to monitor conversations in the room, even while the telephone or facsimile machine, etc. is on-hook.

In older analogue equipment, mechanical switches have been used to physically disconnect the telecommunications equipment, as set forth in U.S. Pat. Nos. 4,675,901 and 4,949,375. However, in digital transmission systems the use of switches becomes problematic since considerable non-voice information must constantly be sent to and received from the telecommunications device. In effect, the device is virtually always on-line although there may be no voice, video, facsimile or such data being exchanged. Many of these digital transmission systems have encryption schemes, as noted above, which make voluntary communications difficult to decipher. However, as previously indicated, it is often nonetheless possible to monitor significant microphonic signals carried by the telephone lines when the telephones are on-hook.

Prior art devices are also known which inherently avoid microphonic behaviour (e.g. U.S. Pat. No. 4,091,232). Such devices, however, are of complex design and consequently fail to resemble contemporary office telecommunications devices. Another major drawback is that these devices are very expensive to manufacture and are therefore suited only for the highest security levels, where cost is not an object.

Therefore, it is an object of an aspect of this invention is to address the on-hook microphonic behaviour of telecommunications devices in a relatively simple cost-effective manner.

SUMMARY OF THE INVENTION

According to one aspect of the present invention there is provided a system for thwarting attempts at eavesdropping on the acoustical environment of a room via a communications line to the room, when the line is on-hook. The system meets US TSG-5 requirements established by the Telephone Security Group (TSG), whose members include the Department of the Air Force, Department of the Army, Central Intelligence Agency, Defense Intelligence Agency, Department of Energy, Federal Bureau of Investigation, Department of the Navy, National Security Agency, US Secret Service, and the Department of State.

The system of the present inventions utilizes a noise generator that is coupled to the line emanating from a wired telecommunications device such as a wired telephone (digital and analogue), wired network device such as a Voice Over IP device, network card, facsimile device, etc. The noise generator has it's spectrum shaped and output level selected so as to mask any microphonic signal that the device may produce during its idle state and is so arranged as to permit normal operation of the device.

To further enhance the security of such devices a relay arrangement is provided at the entrance of the line to the device. This relay arrangement prevents any signal emanating from the device when power is absent. In a typical analogue telephone the noise is interrupted during an actual call since the voice data is not encoded (i.e. upon operation of the device it necessarily becomes a non-secure system).

On the other hand, because there is virtually no energy in the voice-band frequencies (200 Hz–10000 Hz) of digital transmission systems, such systems are typically quite immune from noise in the voice band. Consequently, masking noise must also be generated when power is present in such systems.

The generation of the masking noise should be as random as possible to ensure that an eavesdropper is not able to filter out the noise. This precludes the use of most digital noise generators as they typically repeat a predetermined pattern with some periodicity, or otherwise exhibit some pattern.

For example an eavesdropper with the appropriate equipment and skill could filter out the noise in a manner similar to that used in U.S. Pat. No. 5,805,635. Thus, a simple analogue masking noise generator is provided according to the preferred embodiment of the invention.

BRIEF DESCRIPTION OF THE DRAWINGS

A preferred embodiment of the present invention is described more fully herein below with reference to the accompanying drawings in which.

DETAILED DESCRIPTION OF THE PREFERRED EMBODIMENT

The preferred embodiment set forth below with reference to FIGS. 1 through 5 is based on the Mitel SuperSet 4025 set design. Preferably, Mitel's Digital Network Interface Circuit (DNIC) protocol transmission scheme is used, as implemented in the Mitel MT8971 chip. This embodiment is described in order to illustrate how the present invention may be implemented in a digital telecommunications device. However, the same principles may be used for any ITU H.323 compliant device or any other wired digital transmission device.

Figure 1:
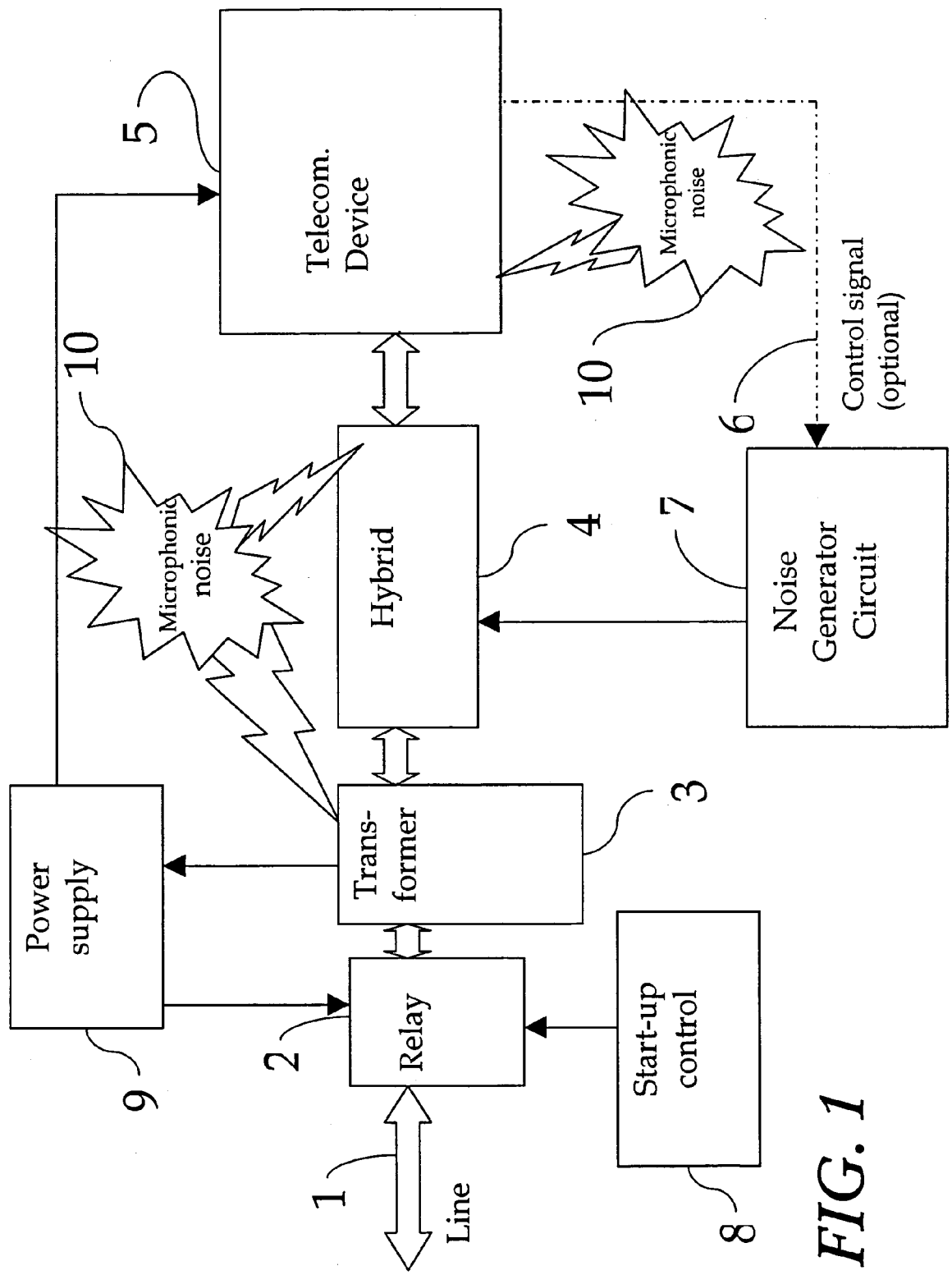
FIG. 1 is a block diagram of a circuit embodying the principles of the present invention.

Turning to FIG. 1, a standard telecommunications device [5] is shown (e.g. Mitel DNIC chip MT8971) connected to a line [1] via a transformer [3] and hybrid [4]. The hybrid [4] provides bi-directional balance between transmit and receive paths allowing a full-duplex connection. A power supply [9] draws its power either from AC mains or the incoming line [1]. As stated above, acoustic energy which impinges on the telecommunications device will, in general, generate some very low microphonic electrical signals. [10] which are coupled into the circuitry and appear on the line [1].

Therefore, according to the invention a noise generator circuit [7] and start-up control circuit [8] are provided in conjunction with a relay [2], as discussed in greater detail below. The purpose of the noise generator circuit is to generate low-level random noise that effectively masks out the microphonic signals [10]. A control signal [6] may also be provided for applications where the noise circuit would interfere with the normal operation of the device. In such applications the control signal [6] is used to mute or modify the spectral content of the noise circuit to allow for normal operation of the device.

The input relay [2] is provided to isolate the telecommunications device [5] from the line [1] in situations where power to the noise circuitry is not present. If the device [5] is not isolated in these situations, the device becomes inoperative and consequently microphonic signals become even more easily intercepted. A start-up control circuit [8] is provided to direct power from the power supply [9] in order to maintain the relay contact closure. Alternatively, the required power could come from an alternate source than the line (this is a requirement on Ethernet as it does not provide phantom powering). Appropriate care must be taken in the design to avoid any damage to the network when the set relays are not powered, as would be understood by a person of ordinary skill in the art.

Figure 2:
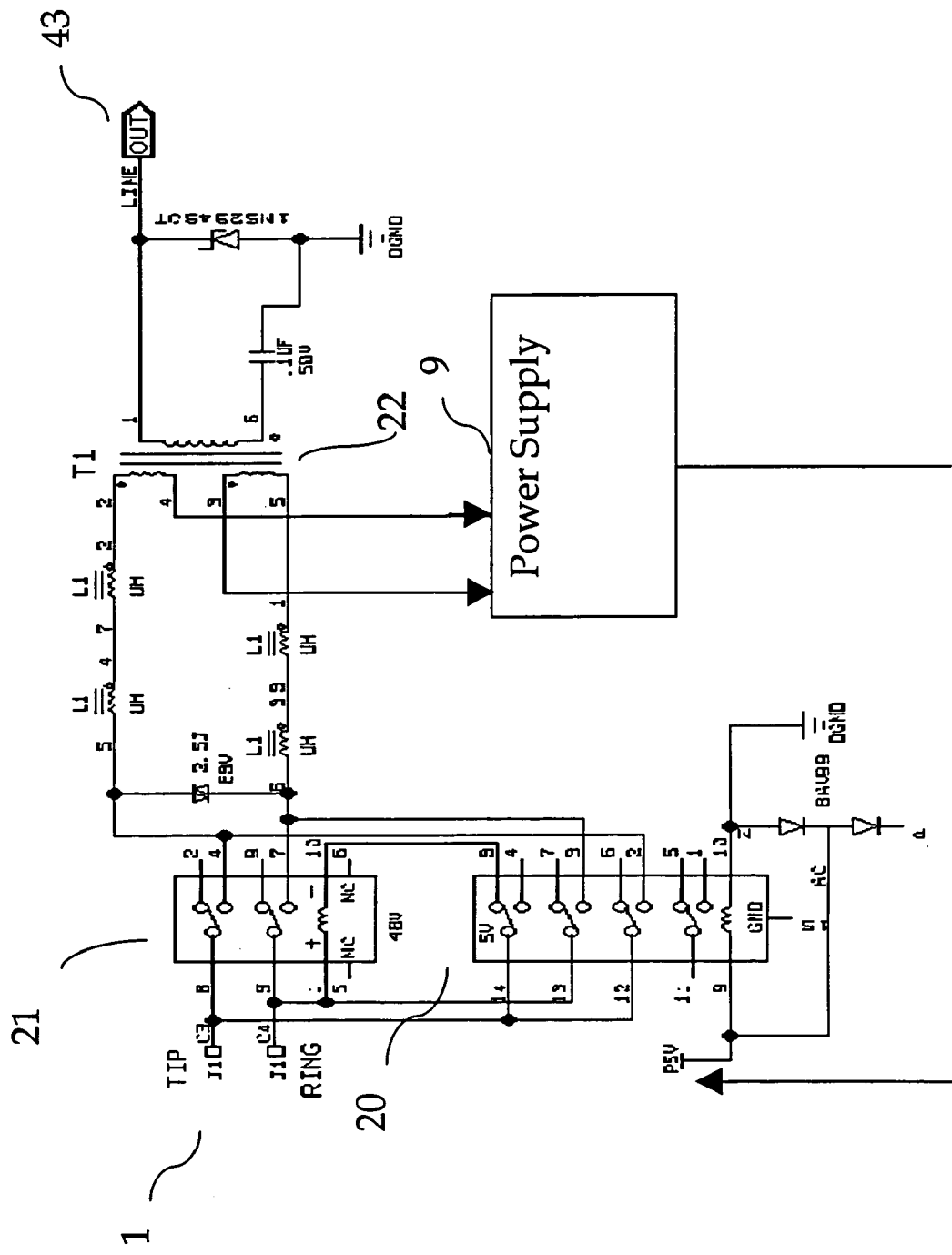
FIG. 2 is a schematic diagram showing details of a relay and transformer in the circuit of FIG. 1.

FIG. 2 illustrates one implementation of the input relay with an automatic start up. In this scheme the start-up relay [21] is open when it has no power. The start-up relay [21] coil is connected between the two incoming lines through the primary relay [20]. When DC power is applied to the incoming line [1] the start-up relay closes [21] and the incoming line [1] is connected to the input transformer [22] and the power supply [9]. The transformer output [43] is connected to hybrid [4]. Once the power supply [9] is operating properly it energises the primary relay [20] which makes a parallel connection to the start up relay of the line [1] and interrupts the actuation voltage of the start-up relay [21]. During loss of power the relays return to the position illustrated in FIG. 2 and the incoming line [1] is short circuited through the coil of the start-up relay. Appropriate caution must be undertaken (e.g. acoustic shielding) to ensure that the coil of the start-up relay does not generate a microphonic signal.

Figure 3:
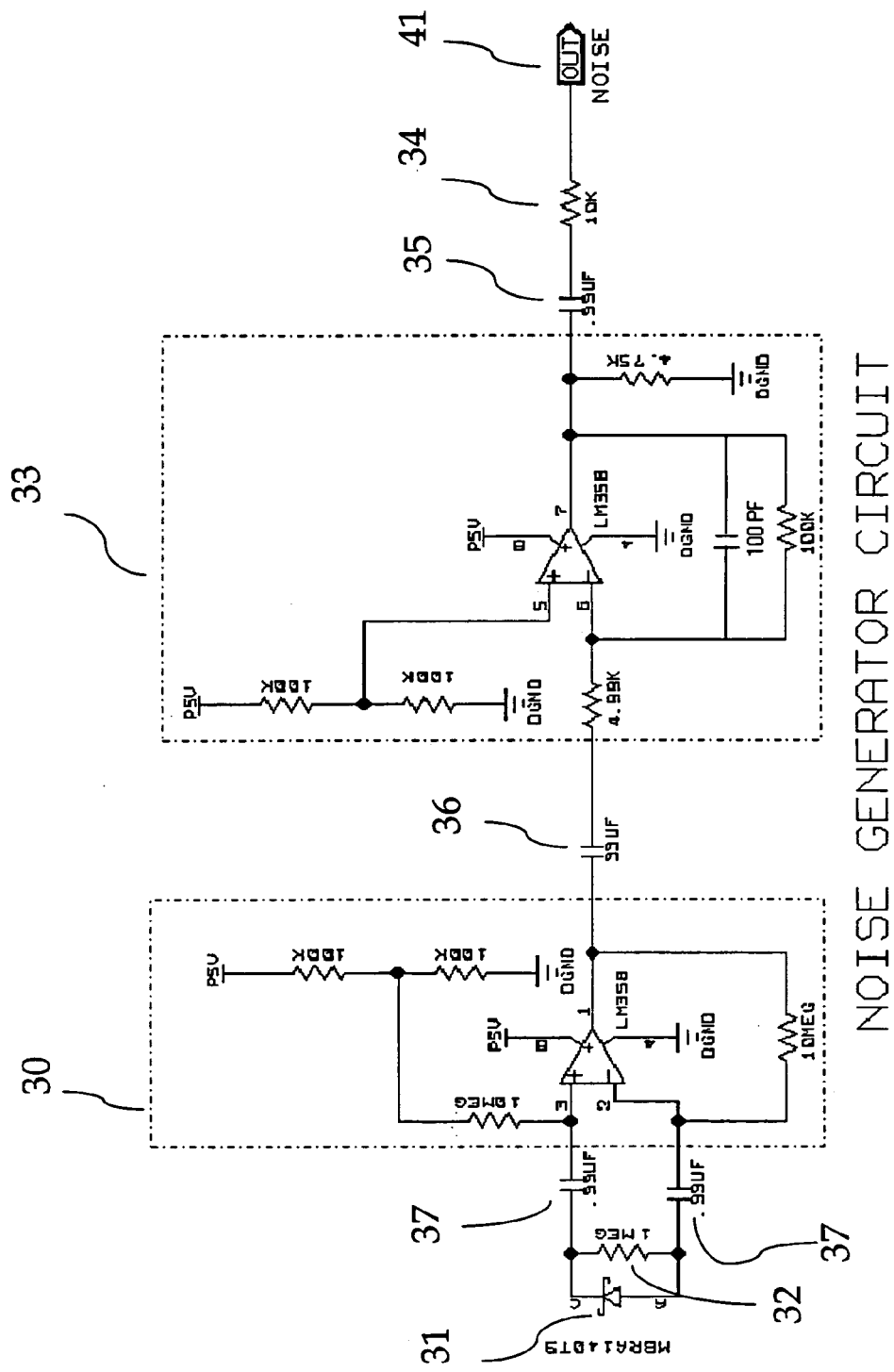
FIG. 3 is a schematic diagram showing details of a noise generator in the circuit of FIG. 1.

FIG. 3 illustrates the noise generation circuit [6] in greater detail. It will be appreciated that the circuit of FIG. 3 is only one of many possible noise generators suitable to the present application. The noise is primarily generated by a Schottky diode [31] and a 1,000,000 ohm resistor [32]. The generated noise is amplified by a differential amplifier [30] that is biased to ½ the power supply voltage to ensure that voltage offset signals do not shape the noise. High impedance feedback resistors also provide high gain and introduce more random noise in the circuit. The amplifier [33] simply amplifies the noise by a gain of about 20. It is also biased at ½ the power supply voltage. A capacitor is connected in a feedback path of the amplifier [33] to provide spectral shaping of the noise signal. Specifically, the signal is restricted to the audio bandwidth so as not to interefere with digital signalling in accordance with the DNIC protocol. All stages are capacitively coupled using coupling capacitors [35, 36, 37] to eliminate any DC voltage gain. The gain of the noise to the line output [41] is governed by the value of the output resistor [34].

Figure 4:
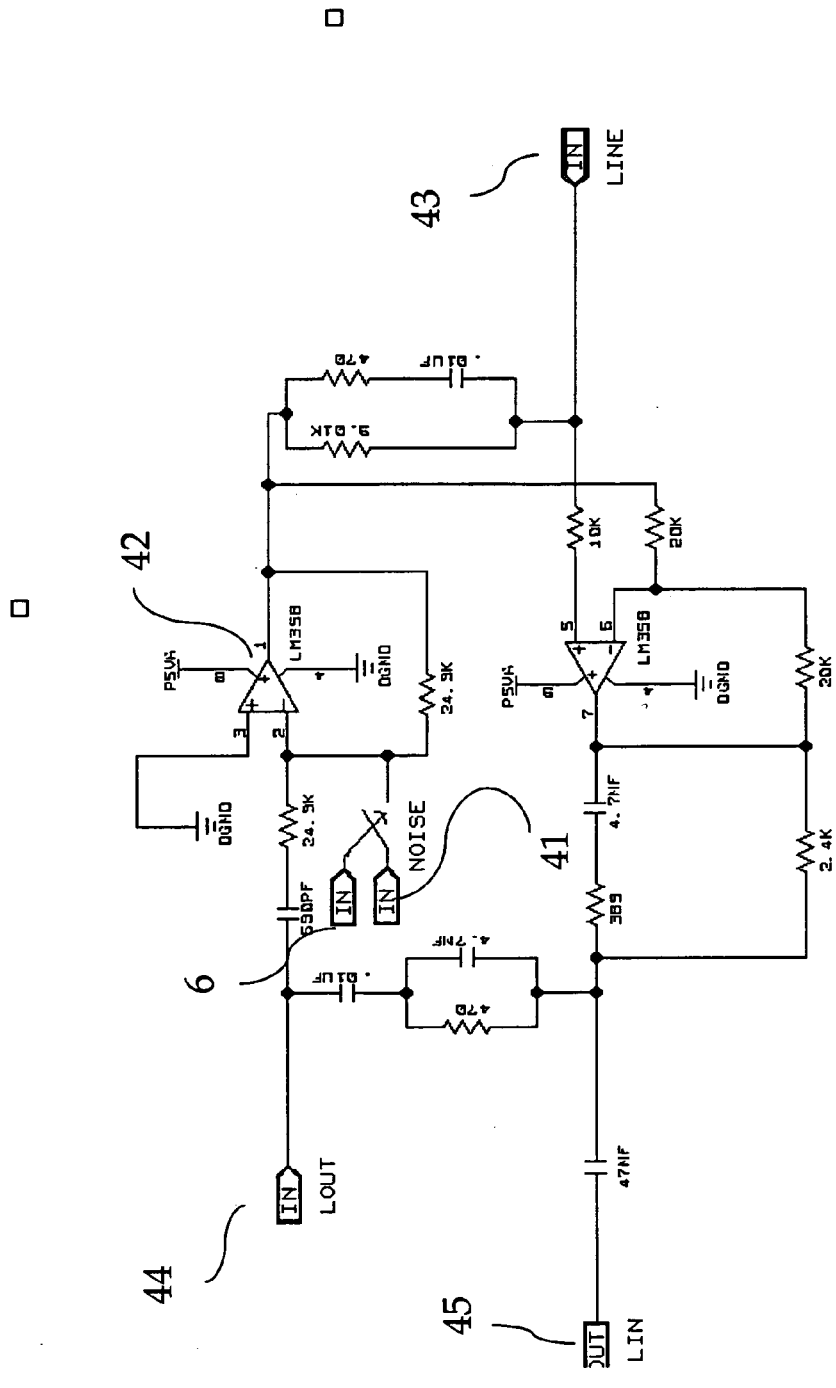
FIG. 4 is a schematic diagram showing details of a hybrid in the circuit of FIG. 1.

FIG. 4 illustrates the hybrid interface from the transformer to the DNIC chip [5]. The circuit is as used in the Mitel MSAS-46 application note entitled "*Loop Extender Circuit for the MT8972 DNIC*". The hybrid interface functions to mix the masking noise with the output signal from the device [5]. Specifically, the noise generator control signal [6] is used to selectively connect the noise signal on output [41] to the input of driver amplifier [42] wherein the noise signal is summed with the signal on output [44] (the output signal (LOUT) from the MT8971 chip). The control signal [6] is illustrated as an input to a switch for selectively disconnecting the noise generator [7], thereby effectively muting the generated noise. Alternatively, a filter or other signal processing apparatus may be used to alter the spectral content of the generated noise to permit normal conversation over the line [1]. The mixed signal is then output to the transformer terminal [43]. The signal on output [45] is transmitted to the input (LIN) of the MT8971 chip [5]. The remaining circuitry in FIG. 4 is as set forth in the MSAS-46 application note.

Figure 5:
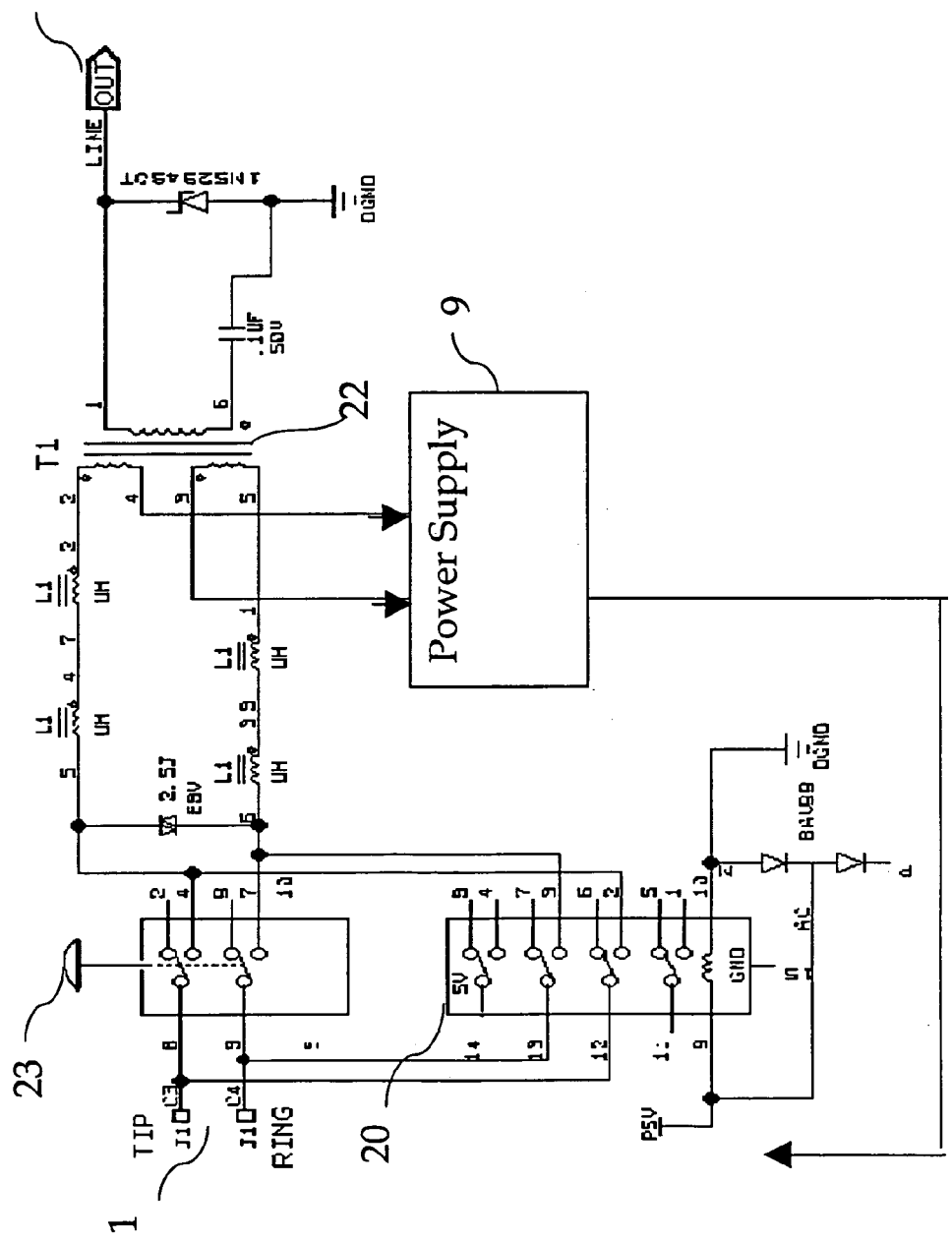
FIG. 5 is a schematic diagram showing details of an alternative relay and transformer in the circuit of FIG. 1.

FIG. 5 illustrates an alternative implementation of the input relay with a push-button start. According to this embodiment, the push button switch [23] is open in the absence of power. When the button [23] is depressed the incoming line [1] is connected to the input transformer [22]

and the power supply [9]. Once the power supply [9] is operating properly it energises the primary relay [20] which makes a parallel connection to the switch of the line [1]. During loss of power the relay [20] returns to the open position illustrated in FIG. 5 and the incoming line [1] is open. In this embodiment, microphonic signals are only possible at the connections from the line [1] to the switch [23] and the relay [20] (which should be very short), and the input line wire [1] itself.

Although a preferred embodiment of the present invention has been described, those skilled in the art will appreciate that variations and modifications may be made. For example, as a further alternative to the start-up relay [21] in the self-start circuit of FIG. 2 and the push-button start circuit of FIG. 5, it is contemplated that a dual mode AC power supply may be provided for actuating the primary relay [20]. This and all other such alternatives and variations are believed to be within the sphere and scope of the invention as defined by the claims appended hereto.

What is claimed is:

1. A system of a powered telecommunications device connected to a communications line, comprising:
   a transformer and hybrid bidirectionally coupling communications between said telecommunications device and said communications line; and
   a noise generator connected to said hybrid applying low level noise to said line, masking microphonic audio signals to thwart eavesdropping on said microphonic audio signals generated by the powered telecommunications device when the device is on-hook and connected to the communications line, without interfering with a normal operation of the powered telecommunications device.

2. The system of claim 1, further comprising:
   a disconnect circuit disconnecting said telecommunications device from said line in the absence of power to said telecommunications device.

3. The system of claim 1, further comprising:
   a control mechanism selectively muting or modifying the spectral content of said noise generator during normal operation of said telecommunications device.

4. The system of claim 2, wherein said disconnect circuit further comprises
   a relay circuitry isolating said telecommunications device from the line during said absence of power, and
   a start-up control circuit directing power to said relay circuitry to maintain a relay contact closure when power is present.

5. The system of claim 4, wherein said disconnect circuit further comprises:
   a pushbutton switch connecting the incoming line to said telecommunications device for normal operation when the power is present.

6. The system of claim 1, wherein said noise generator further comprises
   a Schottky diode connected in parallel to a high resistance resistor generating random noise, and an amplifier circuitry amplifying said noise.

7. The system of claim 1, wherein said noise generator further comprises:
   a filter restricting the frequency spectrum of said random noise to audio bandwidth.

8. The system of claim 7, wherein said noise generator further comprises
   high impedance feedback resistors to said amplifier circuitry providing high gain amplification of said noise and introduction of additional random noise.

9. The system of claim 8, wherein said amplifier circuitry is biased to one half level of said power.

10. The system of claim 9, wherein said noise generator further comprises:
    coupling capacitors between said parallel connected Schottky diode and resistor and said amplifier circuitry to eliminate any DC voltage gain.

11. A method of a powered telecommunications device connected to a communications line, comprising:
    generating low level noise; and
    applying said low level noise to said line, masking microphonic audio signals to thwart eavesdropping on said microphonic audio signals generated by the powered telecommunications device when the device is on-hook and connected to the communications line, without interfering with a normal operation of the powered telecommunications device.

12. The method of claim 11, further comprising:
    disconnecting said telecommunications device from said line in the absence of power to said telecommunications device.

13. The system of claim 11, further comprising:
    selectively muting or modifying the spectral content of said noise generator during normal operation of said telecommunications device.

14. A method, comprising:
    generating and applying low level noise to a communications line connected to a telecommunication device; and
    masking microphonic audio signals inadvertently generated on said communication line, to thwart eavesdropping on said microphonic audio signals which pickup audio sounds in a room containing the telecommunication device when the device is on-hook and connected to the communications line, without interfering with a normal operation of the powered telecommunications device.

* * * * *